United States Patent [19]
Eaton et al.

[11] Patent Number: 5,745,399
[45] Date of Patent: Apr. 28, 1998

[54] DECIMAL ARITHMETIC APPARATUS AND METHOD

[75] Inventors: John Richard Eaton, Salford; Kevin Hughes, Glossop, both of England

[73] Assignee: International Computers Limited, Putney, London, United Kingdom

[21] Appl. No.: 638,171

[22] Filed: Apr. 26, 1996

[30] Foreign Application Priority Data

May 27, 1995 [GB] United Kingdom ............... 9510834

[51] Int. Cl.$^6$ .................................................. G06F 7/52
[52] U.S. Cl. ...................................... 364/771; 364/783
[58] Field of Search ........................... 364/771, 781, 364/782, 783

[56] References Cited

U.S. PATENT DOCUMENTS

| | | | |
|---|---|---|---|
| 4,172,288 | 10/1979 | Anderson | 364/771 |
| 4,799,181 | 1/1989 | Tague et al. | 364/783 |
| 4,805,131 | 2/1989 | Adiletta et al. | 364/783 |
| 5,007,010 | 4/1991 | Flora | 364/771 |
| 5,146,423 | 9/1992 | Fischer et al. | 364/771 |
| 5,673,216 | 9/1997 | Kelley et al. | 364/771 |

FOREIGN PATENT DOCUMENTS 0 271 255  6/1988  European Pat. Off. .

OTHER PUBLICATIONS

Chroust, "A Note on Implementable Decimal Arithmetic Algorithms" Microprocessing and Microprogramming, vol. 22, No. 1, Jan. 1988, pp. 75–77.

*Primary Examiner*—David H. Malzahn
*Attorney, Agent, or Firm*—Lee, Mann, Smith, McWilliams, Sweeney & Ohlson

[57] ABSTRACT

An apparatus for adding two BCD numbers, avoids the need for special adders with detection of carries between BCD digits. First, a sum without carries is generated, by forming the binary sum of the two numbers and an all-sixes pattern, without any carries between BCD digits. Next, a sum with carries is generated, by forming the binary sum of the two numbers and an all-sixes pattern, with carries between BCD digits. A mask pattern is then generated, comprising a six in each BCD digit where the sum without carries is unequal to the sum with carries. A result is then generated by forming the binary sum of the two numbers and the mask pattern, with carries between BCD digits.

4 Claims, 2 Drawing Sheets

DECIMAL ARITHMETIC APPARATUS AND METHOD

BACKGROUND OF THE INVENTION

This invention relates to an apparatus and method for performing decimal arithmetic in a digital computer.

It is well known to represent decimal numbers in binary coded decimal (BCD) form, in which each decimal digit is represented by a group of four bits.

The standard method of adding two BCD numbers is as follows. First, the two numbers are added together as if they were pure binary numbers. Then, an all-sixes pattern is added to the result, i.e. six is added to each BCD digit. This induces carry between successive groups of bits, where the resultant digit is greater than nine. Finally, six is subtracted from each BCD digit that did not produce an iter-digit carry. This returns those digits to their correct values.

However, a problem with this method is that it requires a special form of adder circuit which can detect carries between BCD digits, i.e. between successive groups of four bits.

The object of the present invention is to provide a novel apparatus and method for adding BCD numbers which does not rely on detecting carries between digits and hence does not require a special form of adder circuit with this facility.

SUMMARY OF THE INVENTION

According to the invention there is provided apparatus for adding first and second BCD numbers comprising:

means for generating a sum without carries, by forming the binary sum of said numbers and an all-sixes pattern, without any carries between BCD digits;

means for generating a sum with carries, by forming the binary sum of said numbers and an all-sixes pattern, with carries between BCD digits;

means for generating a mask pattern comprising a six in each BCD digit where said sum without carries is unequal to said sum with carries; and means for generating a result by forming the binary sum of said numbers and said mask pattern, with carries between BCD digits.

DESCRIPTION OF AN EMBODIMENT OF THE INVENTION

One embodiment of the invention will now be described by way of example with reference to the accompanying drawings.

In the following description, d and e represent two seven-digit BCD numbers to be added together. Each of these numbers consists of a 32-bit binary number, the four most significant bits of which are padded with zeroes, and the remaining 28 bits of which represent the seven BCD digits.

Figure 1:
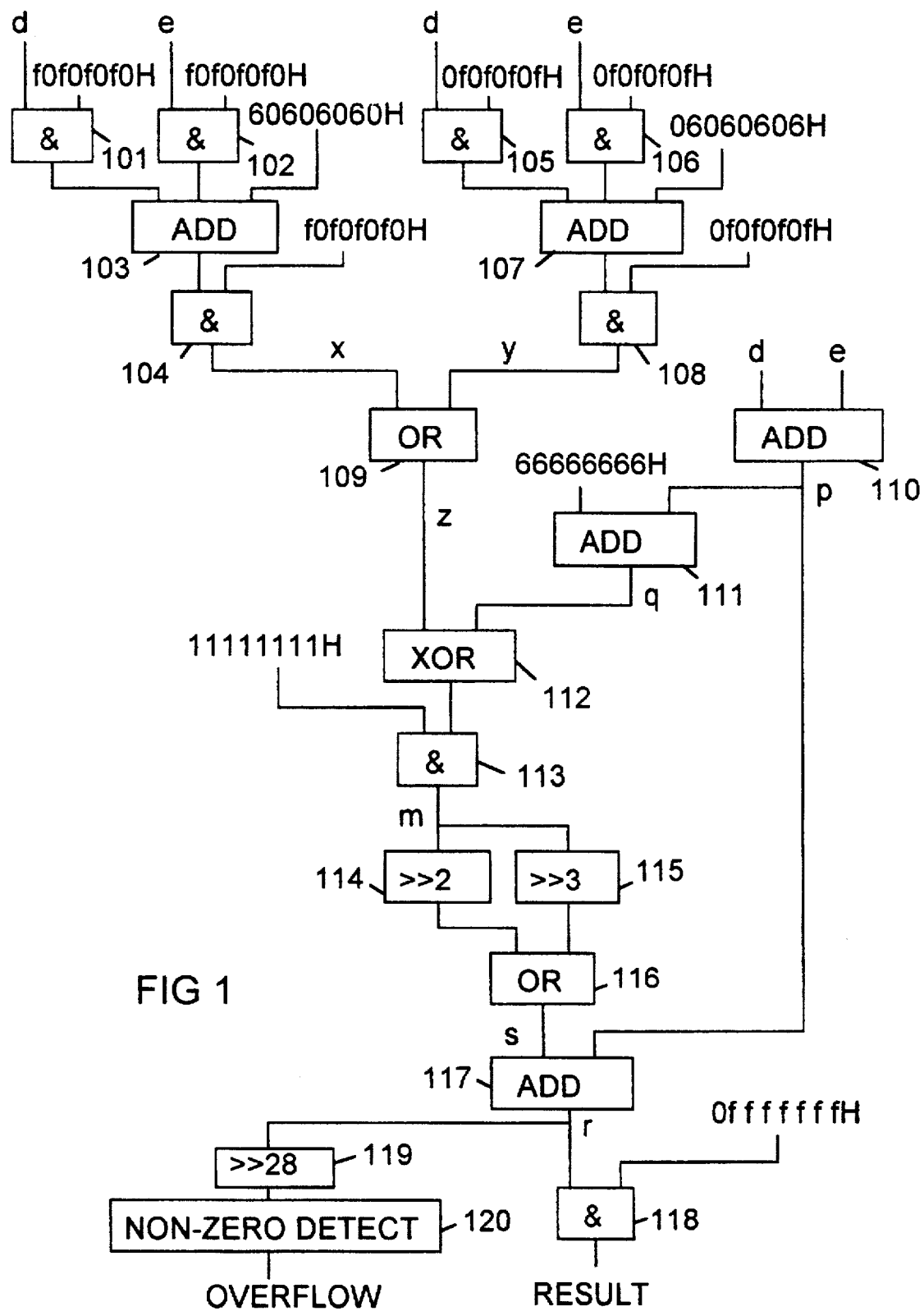
FIG. 1 is a block diagram of a BCD addition circuit embodying the invention.

Referring to FIG. 1, the input numbers d and e are each combined, in respective AND gates 101 and 102, with a mask pattern f0f0f0f0 H (hexadecimal) consisting of the value fifteen (hexadecimal "f", binary 1111) in each of the even-numbered digits and zero (binary 0000) in each of the odd-numbered digits. The outputs of these AND gates are added together in a conventional binary adder 103, along with a pattern 60606060 H consisting of a six (binary 0110) in each of the even-numbered digits and a zero in each of the odd-numbered digits. The result of this addition is combined in AND gate 104 with a mask pattern f0f0f0f0 H to produce a value x. The AND gate 104 masks out any carries into the odd BCD digits produced by the addition. Thus, it can be seen that x represents the carry-free addition of the even-numbered digits of d and e, with a six added to each of these digits.

The input numbers d and e are similarly combined, in respective AND gates 105 and 106, with a mask pattern 0f0f0f0f H consisting of ones in the odd-numbered digits and zeroes in the even-numbered digits. The outputs of these AND gates are added together in a conventional binary adder 107, along with a pattern 06060606 H consisting of sixes in the odd-numbered digits and zeroes in the even-numbered digits. The result of this addition is combined in AND gate 108 with a mask pattern 0f0f0f0f H to produce a value y. The AND gate 108 masks out any carries into the even BCD digits produced by the addition. Thus, it can be seen that y represents the carry-free addition of the odd-numbered digits of d and e, with a six added to each of these digits.

The values x and y are combined in OR gate 109 to produce a value z which represents the carry-free addition of d, e and 66666666 H (i.e. an all-sixes pattern).

The inputs d and e are also added together in a conventional binary adder 110 to produce a value p. This value p is then added to an all-sixes pattern 66666666 H in a conventional binary adder 111, to produce a value q. It can be seen that q represents the addition, with carries, of d, e and 66666666 H.

The carry-free sum z and the sum with carries q are compared in exclusive-OR gate 112. The outputs of this gate is combined in AND gate 113 with an all-ones mask pattern 11111111 H, to produce a value m. It can be seen that m thus contains a one in each BCD digit position for which the carry-free sum z differs from the sum with carries q, all the other digits of m being zero. In other words, m indicates the positions of all the inter-digit carries in the sum with carries.

The value m is fed to two shifters 114 and 115 which shift it right by 2 and 3 bits respectively. The outputs of these shifters are then combined in OR gate 116 to produce a result s. It can be seen that s therefore provides a pattern, comprising BCD digit 6 (binary 0110) at each BCD digit position that generated an inter-digit carry in the sum q, and zero elsewhere. In other words, s consists of sixes only in those BCD digit positions that should generate carries into the next BCD digit positions.

The sixes pattern s is added to the sum with carries p, in a conventional binary adder circuit 117 to produce a value r. The value r is combined in AND gate 118 with a mask pattern 0fffffff H, to produce a final RESULT signal, representing the seven-digit sum of the two BCD inputs d and e. The value r is also applied to a shifter 119 which performs a 28-bit right shift. The output of the shifter 119 is fed to a detection circuit 120, which produces an OVERFLOW signal whenever the shifter output is non-zero, indicating that the sum exceeds the maximum BCD integer length of seven digits.

It should be noted that the additions performed by the adders 107, 111 and 117 are all conventional 32-bit binary additions, using standard binary adders, and do not require any special provisions for detecting carries between BCD digits.

It should also be noted that each of the various AND, OR and exclusive-OR gates shown in FIG. 1 comprises a set of gates for performing a bit-by-bit logic operation, i.e. each corresponding pair of input bits are combined to produce a corresponding output bit.

Figure 2:
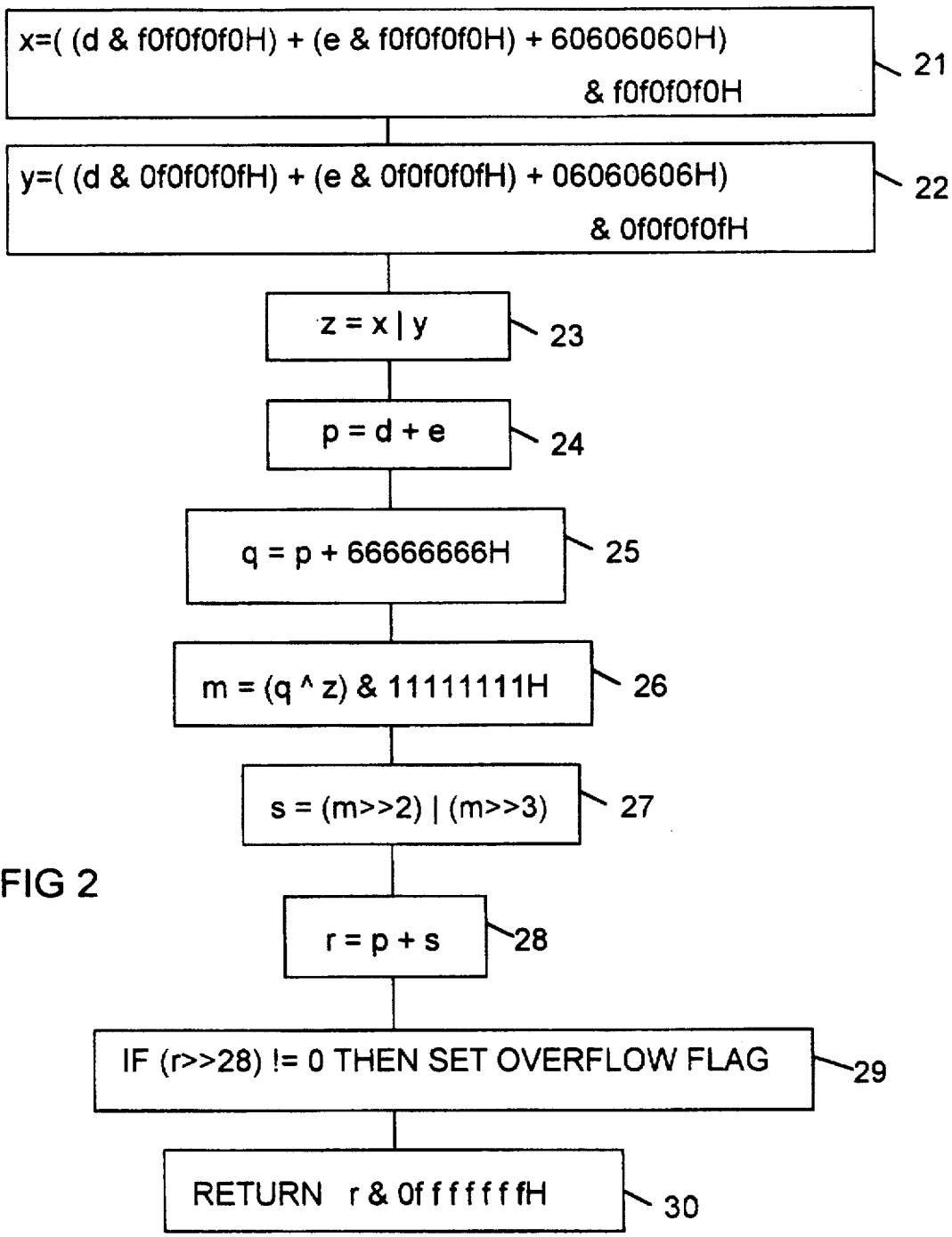
FIG. 2 is a flow chart showing the operation of the circuit of FIG. 1.

FIG. 2 is a flow chart summarising the operation of the circuit of FIG. 1. The correspondence between the steps 21–30 in FIG. 2 and the various gates and adders 101–120 in FIG. 1 is as follows:

step 21 →AND gates 101,102,104; adder 103
step 22 →AND gates 105,106,108; adder 107
step 23 →OR gate 109
step 24 →adder 110
step 25 →adder 111
step 26 →exclusive-OR gate 112; AND gate 113
step 27 →shifters 114,115; OR gate 116
step 28 →adder 117
step 29 →shifter 119; OR gate 120
step 30 →AND gate 118.

It will be appreciated that BCD subtraction can be achieved by forming a nines complement of one of the input BCD numbers (by binary subtracting the number from all-nines, and decimally adding one), and then adding using the technique described above.

Some possible modifications

It will be appreciated that many modifications may be made to the system described above without departing from the scope the present invention. In particular, it will be appreciated that, instead of using the special-purpose logic described above, the invention may be implemented using a suitably programmed general-purpose microprocessor with a conventional binary adder circuit. In this case, the flow chart of FIG. 2 may be regarded as representing the control program for the microprocessor for performing BCD addition.

We claim:

1. Apparatus for adding first and second BCD numbers comprising:

means for generating a sum without carries, by forming the binary sum of said numbers and an all-sixes pattern, without any carries between BCD digits;

means for generating a sum with carries, by forming the binary sum of said numbers and an all-sixes pattern, with carries between BCD digits;

means for generating a mask pattern comprising a six in each BCD digit where said sum without carries is unequal to said sum with carries; and means for generating a result by forming the binary sum of said numbers and said mask pattern, with carries between BCD digits.

2. Apparatus according to claim 1 wherein said means for generating said sum without carries comprises:

means for adding even numbered digits only, and masking out any carries between BCD digits, to produce a first value;

means for adding odd numbered digits only, and masking out any carries between BCD digits, to produce a second value;

means for forming the OR function of said first and second values.

3. A method of adding first and second BCD numbers comprising the steps:

(a) generating a sum without carries, by forming the binary sum of said numbers and an all-sixes pattern, without any carries between BCD digits;

(b) generating a sum with carries, by forming the binary sum of said numbers and an all-sixes pattern, with carries between BCD digits;

(c) generating a mask pattern comprising a six in each BCD digit where said sum without carries is unequal to said sum with carries; and (d) generating a result by forming the binary sum of said numbers and said mask pattern, with carries between BCD digits.

4. A method according to claim 3 wherein said step of generating said sum without carries comprises:

(a) adding even numbered digits only, and masking out any carries between BCD digits, to produce a first value;

(b) adding odd numbered digits only, and masking out any carries between BCD digits, to produce a second value; and (c) forming an OR function of said first and second values.

* * * * *